(12) United States Patent
Chheda et al.

(10) Patent No.: US 7,197,587 B2
(45) Date of Patent: Mar. 27, 2007

(54) SYSTEMS-EVENTS CORE FOR MONITORINGS SYSTEM EVENTS FOR A CELLULAR COMPUTER SYSTEM WITHIN A PARENT COMPUTER SYSTEM, SYSTEM-EVENT MANAGER FOR MONITORING SYSTEM EVENTS FOR MORE THAN ONE CELLULAR COMPUTER SYSTEM, AND RELATED SYSTEM AND METHOD

(75) Inventors: Sachin Chheda, Roseville, CA (US); Dong Wei, Granite Bay, CA (US); Martin O. Nicholes, Antelope, CA (US); David R. Maciorowski, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 577 days.

(21) Appl. No.: 10/176,211

(22) Filed: Jun. 19, 2002

(65) Prior Publication Data
US 2003/0236936 A1 Dec. 25, 2003

(51) Int. Cl.
*G06F 13/24* (2006.01)
(52) U.S. Cl. .................. 710/262; 710/267; 710/260
(58) Field of Classification Search ........ 710/260–269, 710/48–49, 8–10, 16; 713/1–2, 100; 709/244, 709/227, 250
See application file for complete search history.

(56) References Cited
U.S. PATENT DOCUMENTS 5,881,315 A * 3/1999 Cohen ..................... 710/52

| | | | |
|---|---|---|---|
| 5,905,890 A | 5/1999 | Seaman et al. ............. 395/704 |
| 6,055,643 A * | 4/2000 | Chaiken ..................... 713/323 |
| 6,115,779 A * | 9/2000 | Haubursin et al. .......... 710/262 |
| 6,212,676 B1 | 4/2001 | Seaman et al. ................ 717/4 |
| 6,215,486 B1 * | 4/2001 | Walls et al. ................. 715/733 |
| 6,219,742 B1 * | 4/2001 | Stanley ....................... 710/260 |
| 6,247,091 B1 * | 6/2001 | Lovett ......................... 710/260 |
| 6,282,645 B1 * | 8/2001 | Yamaki ....................... 713/100 |
| 6,385,682 B1 * | 5/2002 | Emerson et al. ............ 710/260 |
| 6,446,153 B2 * | 9/2002 | Cooper et al. .............. 710/260 |
| 6,574,197 B1 * | 6/2003 | Kanamaru et al. .......... 370/252 |
| 6,697,954 B1 * | 2/2004 | Stufflebeam ................ 713/330 |
| 6,725,384 B1 * | 4/2004 | Lambino et al. ............ 713/320 |
| 6,826,701 B1 * | 11/2004 | Plante ......................... 713/300 |
| 2003/0065853 A1 * | 4/2003 | Lary et al. .................. 710/260 |

OTHER PUBLICATIONS www.acpi.info/index.html ACPI Specification version 2.1.

* cited by examiner

*Primary Examiner*—Mark H. Rinehart
*Assistant Examiner*—Raymond N Phan

(57) ABSTRACT

A system-event core for monitoring system events in a cellular computer system within a parent computer system is provided. The system-event core comprises: a control register block for each cell computer system configured to mask one or more system events and configurable to be masked by a system-event manager, an input/output block operable to communicate with a computer bus, a register block operable to store data about system events, and interrupt generation logic operable to control interrupts for the cellular computer system.

22 Claims, 3 Drawing Sheets

SYSTEMS-EVENTS CORE FOR MONITORINGS SYSTEM EVENTS FOR A CELLULAR COMPUTER SYSTEM WITHIN A PARENT COMPUTER SYSTEM, SYSTEM-EVENT MANAGER FOR MONITORING SYSTEM EVENTS FOR MORE THAN ONE CELLULAR COMPUTER SYSTEM, AND RELATED SYSTEM AND METHOD

BACKGROUND OF THE INVENTION

In a world of increasingly complex and distributed computer systems, an effective Event Management Service (EMS) is a key part of the necessary system management and administration infrastructure. The EMS provides timely warnings of impending problems, notifies of failing processes, identifies problem areas in a system, and may even automatically fix these problems before system performance interruption occurs. To achieve this, interoperability between different computer systems in a cellular computer architecture is necessary.

The ACPI (Advanced Configuration and Power Interface) specification is an open industry specification co-developed by Compaq, Intel, Microsoft, Phoenix, and Toshiba. The ACPI specification establishes industry-standard interfaces for operating system-directed configuration and power management on laptop, desktop, and server computer systems. The ACPI specification evolves the existing collection of power management BIOS code, Advanced Power Management (APM) and application programming interfaces (APIs, PNPBIOS APIs, and Multiprocessor Specification (MPS) into a single well-defined power-management and configuration interface specification. The ACPI specification enables new power-management technology to evolve independently in operating systems and hardware while ensuring that the operating systems and hardware continue to work together.

The ACPI specification, however, is not explicitly designed to accommodate computer systems with multiple operating systems or multiple power-management specifications, i.e. systems with a cellular computer architecture. The ACPI specification works in tandem with an ACPI-compliant operating system within a single parent computer system, but is not configurable to work with several cellular computer systems within a single parent system. Thus, the ACPI specification does not provide for scalability in a cellular computer architecture. A particular problem arises when several cellular computer systems within a parent computer system are combined into a larger cellular computer system under a single operating system. System events from the smaller cellular systems were not able to be combined into the larger system, thus, system events would be generated for non-existent systems, i.e. the smaller cellular systems that become part of the larger cellular system. Furthermore, most industry implementations of the ACPI specification are assigned to fixed address spaces in I/O memory space and cannot be relocated. Since I/O space is typically limited to 64 KB, the scalability of the ACPI specification is further limited.

SUMMARY OF THE INVENTION

One embodiment of the present invention provides a system-event core for monitoring system events in a cellular computer system within a parent computer system. The system-event core comprises: (a) a program module for a control register block that is configured to mask one or more system events and is configurable to be masked by a system event manager, (b) a program module for an input/output block that can communicate with a computer bus, (c) a program module for a register block that stores data about system events, and (d) a program module for interrupt generation logic that controls interrupts for the cellular computer system.

Such a system-event core allows greater flexibility than the ACPI-specification in the design of a cellular computer system. Specifically, the EMS for each cellular computer system is scalable such that any number of cellular computer systems within a parent computer system can be combined or separated without loss of EMS functionality. Furthermore, since the system-event core can reside in any memory-mapped space, EMS functionality is not limited to the traditional I/O port space as is prevalent in most implementations of the ACPI specification. In addition, the system-event core provides for a consolidated interface between a system's firmware/operating system and system management events.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

An embodiment of the present invention is directed to a scalable cellular-computer management system using one or more system-event cores to manage system events. A cellular computer system is a dedicated portion of a parent computer system that may reside in the parent computer system's memory. Each cellular computer system functions as a computer system independently of other cellular computer systems within the parent computer system. An exemplary cellular computer system may include a separate central processing unit, system memory and input/output devices such as, for example, a keyboard and monitor. Each cellular computer system communicates typical system events to and from the parent computer system via the parent computer's system bus and/or interrupt logic.

System events in computer systems are typically designed within parameters of an industry standard called the Advanced Configuration and Power Interface (ACPI) specification. The ACPI specification, as developed by learned computer technology companies, provides industry common interfaces for the following functions in computer systems: system power management, device power management, processor power management, device and processor performance, plug and play architecture, system management events (SME), battery management, and thermal management. The ACPI specification is well known to those skilled in this art and will not be discussed in detail further herein.

A system-event core is a combination of program modules and digital logic that provides a computer system with SME functionality within the parameters of the ACPI specification. An embodiment of the system-event core of the present invention is designed to provide interfaces for the system events for a computer system, such as the computer system of FIG. 1.

Figure 1:
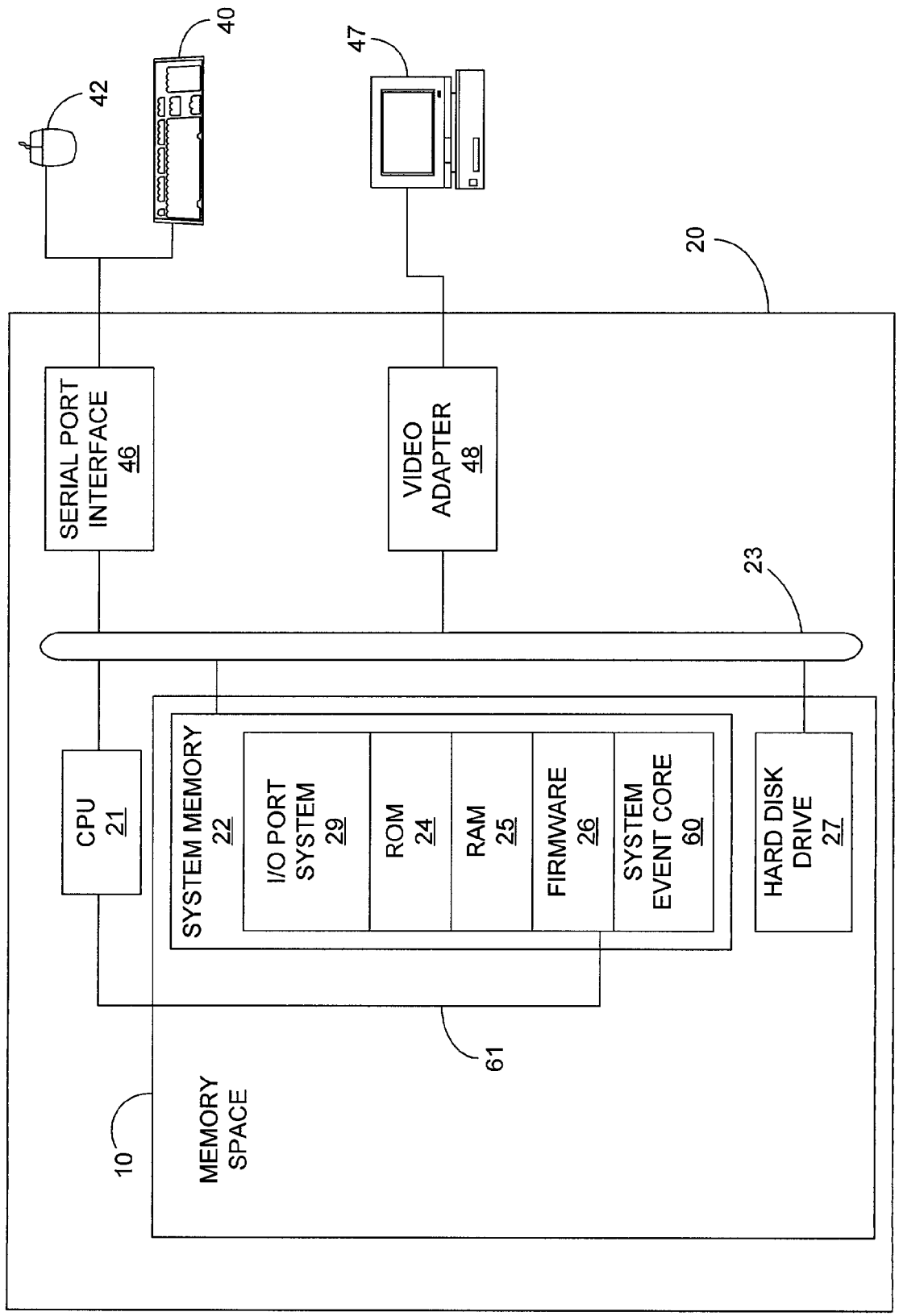
FIG. 1 is a block diagram of a computer system suitable for implementing embodiments of the present invention.

With reference to FIG. 1, an exemplary computer system for implementing various embodiments of the invention includes a general purpose computing device in the form of a conventional cellular computer system 20 (e.g., personal or server), which includes one or more processing units 21, a memory space 10, and a system bus 23. The system bus 23 couples the various system components including the memory space 10 to the processing unit 21. The system bus 23 may be any of several types of busses including a memory bus or a memory controller, a peripheral bus, and a local bus using, any of a variety of bus architectures. The memory space 10 may contain up to six types of address space, namely, system I/O (not shown), system memory 22, PCI configuration memory (not shown), SMBus memory (not shown), embedded controller memory (not shown), and functional fixed hardware memory (not shown). The system memory 22 includes read-only memory (ROM) 24 and random-access memory (RAM) 25. Firmware 26 containing the basic routines that help to transfer information between elements within the computer system 20 is also contained within the system memory 22. Additionally, I/O port space 29 is within system memory 22 for storing instructions and operating parameters for various input/output devices. The computer system 20 further includes a hard disk drive 27 for reading from and writing to a hard disk (not shown) that is also connected to the system bus 23 through a hard disk controller (not shown). Additionally, optical drives, CD-ROM drives, floppy drives may be connected to the system bus 23 through respective drive controllers as well.

A number of program modules may be stored in memory space, typically on the hard disk, ROM 24 or RAM 25. These program modules include one or more operating systems, one or more application programs, and other data. A system-event core 60 also resides in system memory 22, but alternatively may reside in any memory-mapped space within available memory space 10. In addition, the system-event core 60 can access a dedicated interrupt line 61 to the CPU 21.

A user may enter commands and information into the computer system 20 through input devices such as a keyboard 40 and pointing device 42. These input devices as well as others not shown are typically connected to the system bus 23 through a serial-port interface 46. Other interfaces (not shown) include Universal Serial Bus (USB) and parallel ports. A monitor 47 or other type of display device may also be connected to the system bus 23 via an interface such as a video adapter 48.

In a parent computer system, several partitioned domains are resident, each partitioned domain having a unique operating system. Within each partitioned domain, several cellular computer systems may be resident within the system memory of the partitioned domain. As was previously mentioned, each cellular computer system may have one or more dedicated CPUs, memory space, and input/output devices. The parent computer system can monitor the operation of each cellular computer system by polling for system events. The ACPI specification was designed to be an industry standard for monitoring computer operation and polling for system events. However, the ACPI specification was developed for a single computer system. When cellular computer architecture is present, the ACPI specification is not appropriate for system events monitoring. By providing a system-event manager and a system-event core for each cellular computer system, the parent computer system can efficiently, and effectively monitor the operation of all resident cellular computer systems.

Figure 2:
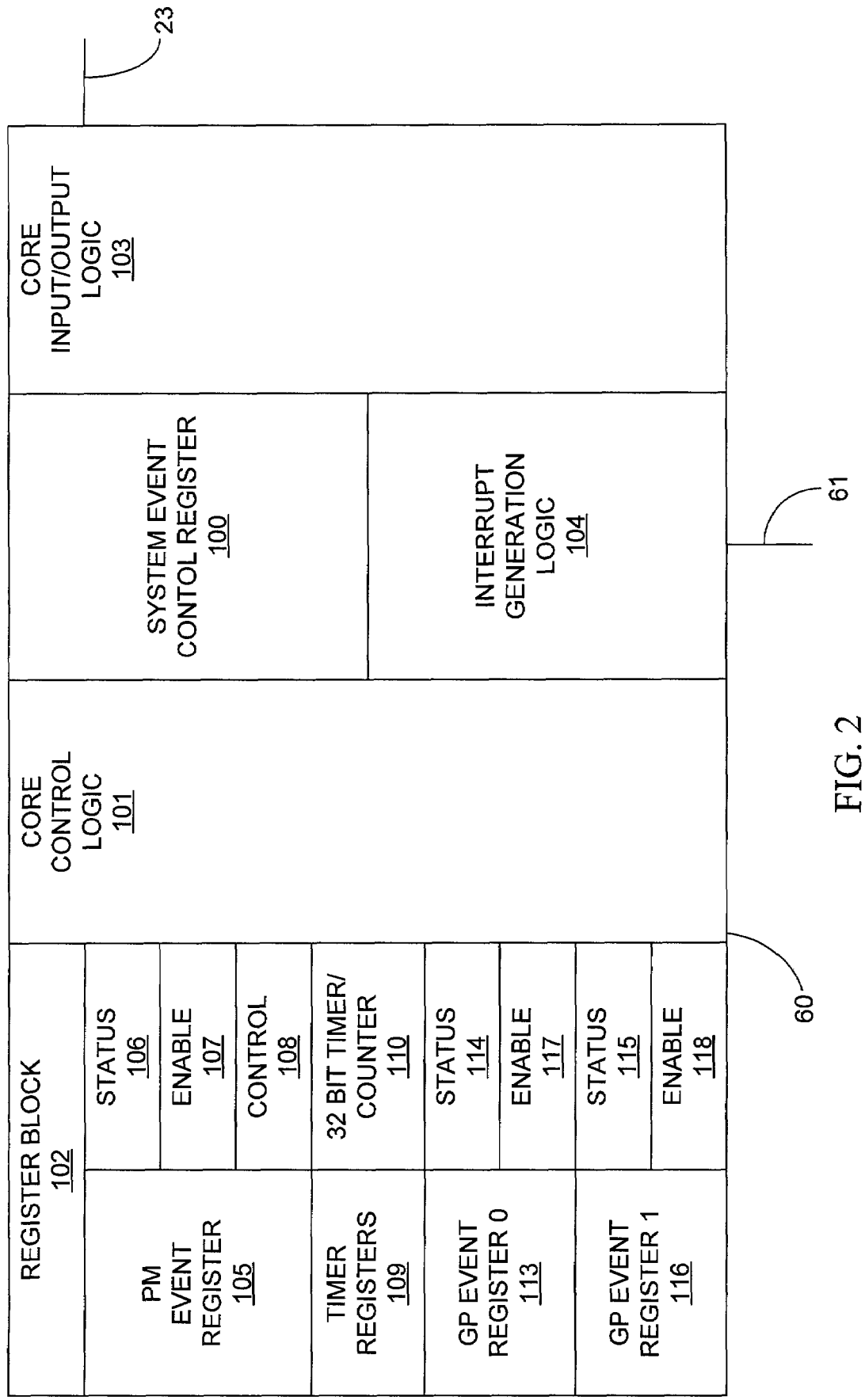
FIG. 2 is a block diagram of system-event core according to an embodiment of the present invention.

FIG. 2 is a block diagram of the system-event core 60 configured for monitoring system events in the computer system 20 of FIG. 1. The system-event core 60 can be any combination of firmware or software with the following program modules and register blocks. First, the system-event core 60 includes a System Event Control Register (SECR) 100, which is a multi-purpose register that provides a disable/reset register for all of the other registers in the system-event core 60. Additionally the SECR 100 provides a second level individual interrupt mask register that will be discussed in further detail below. Every system-event core 60 contains an instance of the SECR 100. The SECR is set based on the configuration of the particular cellular computer system for which it is assigned. In cellular-computer-system architecture, it is also possible to combine multiple cellular computer systems to act as one cellular computer system. Using the SECR 100, the system-event manager (described in detail below) can selectively use parts of the system-event core 60 as needed.

The system-event core 60 also includes core control logic 101. The core control logic 101 provides communication and data-transfer protocols within the system-event core 60. Since communication and data-transfer protocols are well known, the specifics of the core control logic 101 will not be discussed.

The system-event core 60 also contains a core register block 102 which includes the various registers that store information about system events. As was previously noted, the system-event core 60 resides in one of six address spaces; system I/O, System memory, PCI configuration, SMBus, embedded controller, and functional fixed hardware. Different implementations will result in different address spaces being used for different functions. The core register block 102 consists of fixed hardware registers and generic hardware registers. Fixed hardware registers are required to implement system event interfaces. The generic hardware registers are needed for any events not defined within the system-event core 60 specification or the ACPI specification. The core register block 102 has several defined register blocks that include the following: power management event register block 105 (the power management event register block 105 contains a status 106, enable 107 and control 108 registers), power management timer register and counter set 109 (a 32-bit timer/counter 110), a first 113 and a second 116 general purpose register block (each set containing a status 114 and 117 and enable 115 and 118 register). These defined register blocks do not differ from the ACPI specification and, thus, will not be discussed further herein.

The system-event core 60 also contains core input/output logic 103 which sets parameters for transmitting and receiving data to and from the system bus 23 in the cellular or parent computer system. As was the case before, the core input/output logic 103 does not differ from the ACPI specification and, thus, will not be discussed further herein.

In addition, the system-event core 60 contains interrupt-generation logic 104. As mentioned previously, certain system events initiate an interrupt or hardware sequence to notify the CPU 21 of the parent computer system 20 (FIG. 1). ACPI-compatible hardware can choose to support both legacy and ACPI modes. Legacy hardware is needed to support these features for non-ACPI-compatible operating systems. As was the case previously, the interrupt-generation logic 104 does not differ from the ACPI specification and, thus, will not be discussed further herein Collectively, the system-event core 60 described above provides EMS functionality to a computer system such as the computer system of FIG. 1. The computer system of FIG. 1 may contain one or more cellular computer systems, each cellular computer system requiring EMS functionality.

Figure 3:
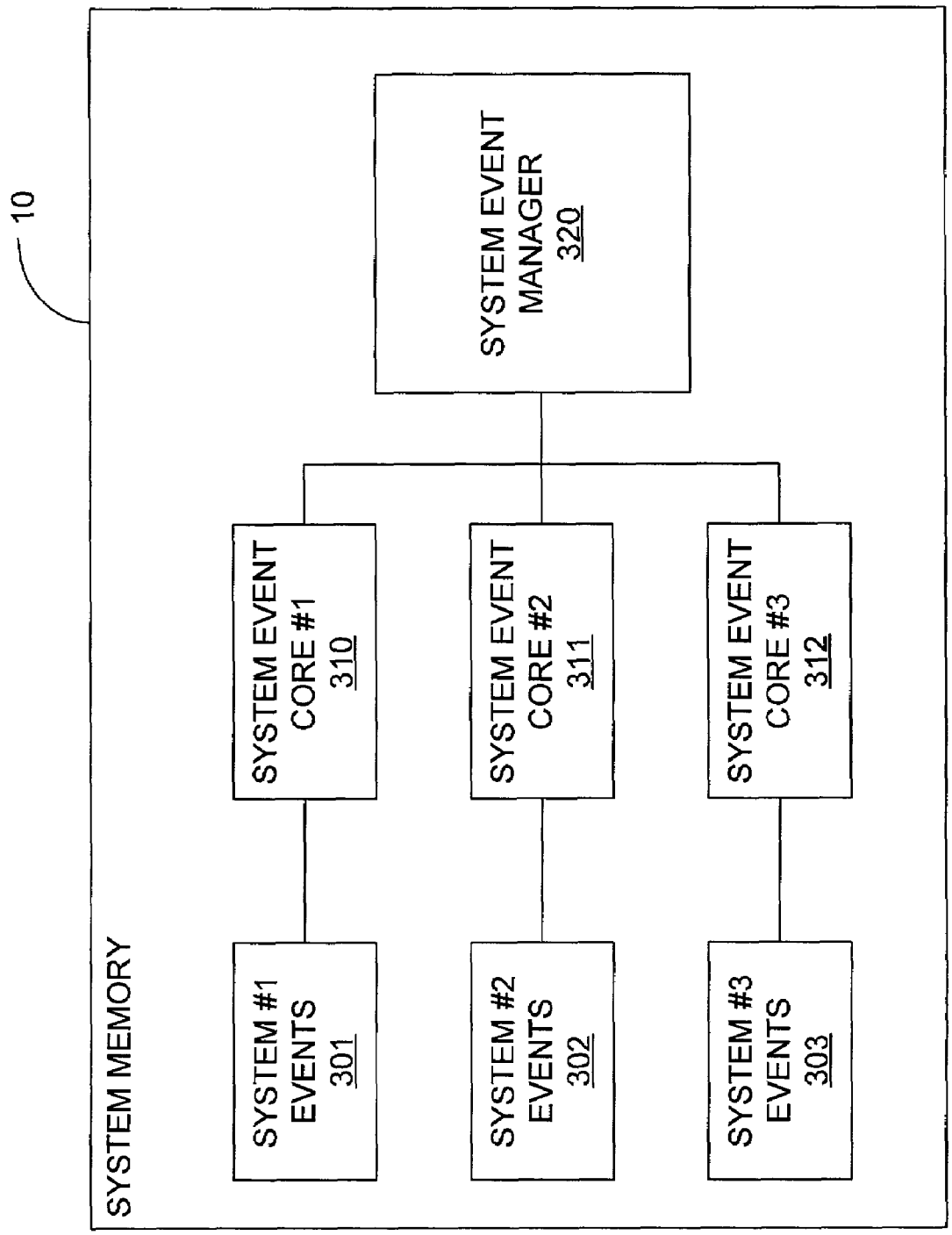
FIG. 3 is a block diagram of a computer-system memory with three cellular computer systems, each having a respective system-event core according to an embodiment of the invention.

FIG. 3 is an exemplary representation of three system-event cores 60 residing in the memory space 10 of a parent-computer system. In this example, the parent-computer system has three cellular computer systems 301, 302, and 303. Each cellular computer system is monitored by the parent-computer system through respective system-event cores 310, 311, and 312. The parent-computer system includes a system-event manager 320 that monitors each system-event core 310, 311, and 312 for system events that may occur within each cellular computer system 301, 302, and 303. The system-event manager 320 can be configured to monitor any number of system-event cores 60 and can also be configured to monitor for only specified events in any or all monitored system-event cores 60.

Each system event, such as for example, a power-button event, is capable of being masked, such that any input or output with respect to the particular system event will be ignored by the system-event core 60. Additionally, the entire cellular computer system can be masked at a second level, i.e. by the system event manager 320, such that any system event with respect to a particular cellular computer system will be ignored by the system event manager 320.

By way of example, when an event occurs, such as a power-button event within the first cellular system 301, the system-event core 310 for the first cellular computer system 301 identifies the event and denotes the event by setting one or more bits in the proper register within the system-event core 310. The system-event core 310 then sends a signal to the system-event manager 320 indicating a power-button event. If, however, the power-button event is masked at the system-event core 310, the signal to the system-event manager 320 is not sent. This first level of masking is accomplished by setting individual bits in the SECR 100 (See FIG. 2) of the system-event core 310. Each bit in the SECR corresponds to a system event in the cellular computer system 301. By setting the corresponding bit in the SECR to one, the system event is masked and signals to the system-event manager 320 are disabled for the particular system event. Thus, if the corresponding bit of the SECR of the first system-event core 310 is set to logic one, the power-button event signal is masked, and thus, will not be sent to the system-event manager 320.

The second level of masking allows the system event manager 320 to mask all signals generated by the individual system-event cores 310, 311, and 312. By setting individual bits of a control register (not shown) in the system-event manager 320, all signals generated from a particular system-event core can be masked. Thus, for example, the entire second system-event core 311, along with the respective cellular computer system 302 can be essentially ignored by the system event manager 320, if the corresponding bit in the control register of the system-event manager is set to logic one.

The second level of masking allows for a system-event manager 320 to optimize signals from several system-event cores in a cellular computer system when individual cells are combined to form a larger cellular computer system. For example, each cellular computer system 301, 302, and 303 may be combined to form a larger cellular system, i.e. the memory space dedicated to each system with three operating systems is now dedicated to a single system with a single operating system. When combining systems is called for, typically, the first system-event core 310 will correspond to the newly created larger cellular computer system. Instead of reconfiguring each individual system-event core 310, 311, and 312 that correspond to each cellular computer system 301, 302, and 303, the system event manager 320 can be configured to mask the entire array of signals from particular system-event cores. Thus, in this example, the system-event core 320 would be configured to ignore the signals from the second 311 and third 312 system-event cores since neither one corresponds to a dedicated cellular computer system. Instead, the signals from the first system-event core 310 will correspond to the now single large cellular computer system.

While the preferred embodiment of the invention has been illustrated and described, it will be appreciated that various changes can be made therein without departing from the spirit and scope of the invention.

The invention claimed is:

1. A system-event core for monitoring system events for a cellular computer system within a parent computer system, the system-event core comprising:
   (a) a control register configured to mask one or more system events and configurable to be masked by a system event manager.
   (b) an input/output block operable to communicate with a computer bus;
   (c) a register block operable to store data about system events; and
   (d) interrupt generation logic operable to control interrupts for the cellular computer system.

2. The system-event core of claim 1 further comprising a program module for masking one or more inputs in the input/output block.

3. The system-event core of claim 1 further comprising a program module for masking one or more outputs in the input/output block.

4. The system-event core of claim 1, wherein the system-event core resides in memory-mapped space in a computer system.

5. A computer system comprising:
   (a) a system-event manager program module; and
   (b) at least two cellular computer systems, each cellular computer system comprising a system-event core for monitoring system events for the cellular computer system, each system-event core comprising:
      (i) a control register configured to mask one or more system events and configurable to be masked by the system-event manager program module;
      (ii) an input/output block operable to communicate with a computer bus;
      (iii) a register block operable to store data about system events; and
      (iv) interrupt generation logic operable to control interrupts for the cellular computer system.

6. The computer system of claim 5, wherein the system-event cores reside in memory-mapped space in the computer system.

7. The computer system of claim 5 further comprising a single register block for system management events (SME), the single register block storing data about the system management events of each cell computer system.

8. The computer system of claim 7 further comprising a program module for masking one or more system management events for each cell computer system.

9. The computer system of claim 5 wherein the system event manager is operable to mask the control register for one of the cellular computer system.

10. The computer system of claim 5 wherein the system event manager is configured to mask the interrupt generation logic for one of the cellular computer system.

11. A computer-readable medium containing computer-executable instructions for providing system event functionality to at least two cellular computer systems within a parent computer system, the computer-readable medium containing computer-executable instructions comprising:
   (a) a system-event manager program module; and
   (b) at least two cellular computer systems each cellular computer system having a system-event core for monitoring system events for the cellular computer system, the system-event core comprising:
      (i) a control register configured to mask one or more system events and configurable to be masked by the system-event manager program module;
      (ii) an input/output block operable to communicate with a computer bus;
      (iii) a register block operable to store data about system events; and
      (iv) interrupt generation logic operable to control interrupts for the cellular computer system.

12. A system-event manager for monitoring system events for more than one cellular computer system, the system-event manager comprising:
   (a) a control register operable to mask signals generated by system-event cores corresponding to one or more cellular computer systems;
   (b) an input/output block operable to communicate with a computer bus and at least one system-event core, each system-event core monitoring system events for the corresponding cellular computer system;
   (c) a register block operable to store data about system events signals generated by each system-event core; and
   (d) interrupt generation logic operable to control interrupts for each cellular computer system.

13. The system-event manager of claim 12 further comprising a program module for masking one or more system events in the input/output block of the system-event manager.

14. The system-event manager of claim 12, wherein the system-event manager resides in memory mapped space in a computer system.

15. A computer-based method for providing system event management for a cellular computer system, the method comprising:
   (a) monitoring a cellular computer system for system events with a system-event core;
   (b) determining that a system event has occurred in a cellular computer system;
   (c) sending a signal from the system-event core to a system-event manager to indicate that a system event has occurred; and
   (d) sending a signal from the system-event manager to a system central processing unit to indicate that a system event has occurred if the system event has not been masked.

16. The method of claim 15 wherein the signal sent to the system central processing unit is an interrupt signal.

17. The method of claim 15 further comprising determining that a system event is not masked before sending a signal from the system-event core to the system-event manager.

18. The method of claim 15 further comprising determining that a system event is not masked before sending a signal from the system-event manager to the system central processing unit.

19. A computer-based method for providing system event management for a cellular computer system, the method comprising:
   (a) monitoring more than one cellular computer system for system events with a corresponding system-event core for each cellular computer system;
   (b) determining that a system event has occurred in a cellular computer system; and
   (c) sending a signal from the corresponding system-event core to a system-event manager to indicate that a system event has occurred if the system-event core has not been masked.

20. The method of claim 19 further comprising masking one or more system-event core from sending a signal to the system-event manager.

21. The method of claim 19 further comprising masking one or more system events in a cellular computer system from sending a signal to the corresponding system-event core.

22. The method of claim 19 further comprising sending a signal from the system-event manager to a system central processing unit to indicate that a system event has occurred if the system-event core has not been masked by the system-event manager.

* * * * *

UNITED STATES PATENT AND TRADEMARK OFFICE
CERTIFICATE OF CORRECTION

PATENT NO. : 7,197,587 B2  Page 1 of 1
APPLICATION NO. : 10/176211
DATED : March 27, 2007
INVENTOR(S) : Sachin N. Chheda et al.

It is certified that error appears in the above-identified patent and that said Letters Patent is hereby corrected as shown below:

On the Title page, in Item (54), in "Title", in column 1, lines 1-2, delete "SYSTEMS-EVENTS CORE FOR MONITORINGS" and insert -- SYSTEM-EVENT CORE FOR MONITORING --, therefor.

On the Title page, in Item (75), in "Inventors", in column 1, line 1, delete "Sachin Chheda" and insert -- Sachin N. Chheda --, therefor.

In column 1, lines 1-2, delete "SYSTEMS-EVENTS CORE FOR MONITORINGS" and insert -- SYSTEM-EVENT CORE FOR MONITORING --, therefor.

In column 6, line 27, in Claim 1, after "manager" delete "." and insert -- , --, therefor.

Signed and Sealed this

Eighth Day of September, 2009

David J. Kappos
*Director of the United States Patent and Trademark Office*